US009836150B2

United States Patent
Levesque et al.

(10) Patent No.: US 9,836,150 B2
(45) Date of Patent: Dec. 5, 2017

(54) SYSTEM AND METHOD FOR FEEDFORWARD AND FEEDBACK WITH HAPTIC EFFECTS

(71) Applicant: Immersion Corporation, San Jose, CA (US)

(72) Inventors: Vincent Levesque, Montreal (CA); Juan Manuel Cruz-Hernandez, West Montreal (CA)

(73) Assignee: Immersion Corporation, San Jose, CA (US)

( * ) Notice: Subject to any disclaimer, the term of this patent is extended or adjusted under 35 U.S.C. 154(b) by 250 days.

(21) Appl. No.: 13/830,162

(22) Filed: Mar. 14, 2013

(65) Prior Publication Data

US 2014/0139452 A1    May 22, 2014

Related U.S. Application Data (60) Provisional application No. 61/728,665, filed on Nov. 20, 2012, provisional application No. 61/728,661, (Continued)

(51) Int. Cl.
*G06F 3/041* (2006.01)
*G06F 3/01* (2006.01)
*G06F 3/0488* (2013.01)

(52) U.S. Cl.
CPC ............ *G06F 3/0414* (2013.01); *G06F 3/016* (2013.01); *G06F 3/0416* (2013.01); *G06F 3/0488* (2013.01); *G06F 2203/04809* (2013.01)

(58) Field of Classification Search
CPC .......... G06F 3/016; G06F 3/041–3/048; G06F 1/1692; G06F 2203/04808;
(Continued)

(56) References Cited

U.S. PATENT DOCUMENTS 6,703,924 B2    3/2004    Tecu et al.
7,742,036 B2    6/2010    Grant et al.
(Continued)

FOREIGN PATENT DOCUMENTS

CN    101480024 A    7/2009
CN    100587657 C    2/2010
(Continued)

OTHER PUBLICATIONS

Bau, O. et al., TeslaTouch: Electrovibration for touch surfaces, UIST '10 Proceedings of the 23nd annual ACM symposium on User interface software and technology, pp. 283-292, 2010.
(Continued)

*Primary Examiner* — Nalini Mummalaneni
(74) *Attorney, Agent, or Firm* — Kilpatrick Townsend & Stockton LLP (57) ABSTRACT

Systems and methods for feedforward and feedback with haptic effects are disclosed. One such system may include a sensor configured to detect an interaction with a touch surface and transmit a sensor signal associated with the interaction; a processor in communication with the sensor, the processor configured to: determine an operation available on a device, the operation associated with a first user interaction; determine a simulated texture associated with the operation; output a haptic signal associated with the simulated texture; determine whether to perform the operation based on a second user interaction; and a haptic output device in communication with the processor and coupled to the touch surface, the haptic output device configured to receive a haptic signal and simulate a texture on the touch surface based in part on the haptic signal.

20 Claims, 7 Drawing Sheets

Related U.S. Application Data filed on Nov. 20, 2012, provisional application No. 61/728,727, filed on Nov. 20, 2012.

(58) Field of Classification Search
CPC ....... G06F 2203/0409; G06F 2203/014; G09B 21/003; G09B 21/004; G09B 21/005; G09B 21/007; G09B 21/008; H01H 2215/00; H03K 17/96; H03K 17/962; H03K 17/9622; H03K 2217/96062; A63F 2300/1037; G01C 21/3664; A61M 2205/505

See application file for complete search history.

(56) References Cited

U.S. PATENT DOCUMENTS

| | | | |
|---|---|---|---|
| 7,916,002 B2 * | 3/2011 | Uusitalo et al. | 340/407.2 |
| 7,924,144 B2 | 4/2011 | Makinen et al. | |
| 7,982,588 B2 | 7/2011 | Makinen et al. | |
| 8,026,798 B2 | 9/2011 | Makinen et al. | |
| 8,174,373 B2 | 5/2012 | Makinen et al. | |
| 8,330,590 B2 | 12/2012 | Poupyrev et al. | |
| 8,405,618 B2 | 3/2013 | Colgate | |
| 8,469,806 B2 | 6/2013 | Grant et al. | |
| 8,849,355 B2 | 9/2014 | Choi | |
| 2005/0122317 A1 * | 6/2005 | Schaaf et al. | 345/173 |
| 2005/0134562 A1 | 6/2005 | Grant et al. | |
| 2008/0024459 A1 | 1/2008 | Poupyrev et al. | |
| 2009/0167704 A1 | 7/2009 | Terlizzi et al. | |
| 2009/0231271 A1 | 9/2009 | Heubel et al. | |
| 2010/0231367 A1 | 9/2010 | Cruz-Hernandez et al. | |
| 2010/0231508 A1 | 9/2010 | Cruz-Hernandez et al. | |
| 2010/0231539 A1 | 9/2010 | Cruz-Hernandez et al. | |
| 2010/0231540 A1 | 9/2010 | Cruz-Hernandez et al. | |
| 2010/0231541 A1 | 9/2010 | Cruz-Hernandez et al. | |
| 2010/0231550 A1 | 9/2010 | Cruz-Hernandez et al. | |
| 2011/0018697 A1 | 1/2011 | Birnbaum et al. | |
| 2011/0021272 A1 | 1/2011 | Grant et al. | |
| 2011/0199342 A1 | 8/2011 | Vartanian et al. | |
| 2011/0216025 A1 * | 9/2011 | Kurita | 345/173 |
| 2011/0248916 A1 | 10/2011 | Griffin et al. | |
| 2011/0285666 A1 | 11/2011 | Poupyrev et al. | |
| 2011/0300910 A1 | 12/2011 | Choi | |
| 2012/0133494 A1 | 5/2012 | Cruz-Hernandez et al. | |
| 2012/0154330 A1 * | 6/2012 | Shimizu | 345/174 |
| 2012/0229400 A1 | 9/2012 | Birnbaum et al. | |
| 2012/0268412 A1 | 10/2012 | Cruz-Hernandez et al. | |
| 2013/0057509 A1 | 3/2013 | Cruz-Hernandez et al. | |
| 2014/0118127 A1 | 5/2014 | Levesque et al. | |
| 2014/0139450 A1 | 5/2014 | Levesque et al. | |
| 2014/0139451 A1 | 5/2014 | Levesque et al. | |
| 2014/0139452 A1 | 5/2014 | Levesque et al. | |
| 2016/0216765 A1 | 7/2016 | Levesque et al. | |

FOREIGN PATENT DOCUMENTS

| | | |
|---|---|---|
| CN | 102349039 A | 2/2012 |
| CN | 102355526 A | 2/2012 |
| CN | 103838423 A | 6/2014 |
| CN | 103838424 A | 6/2014 |
| CN | 104798013 A | 6/2015 |
| EP | 1 310 860 A1 | 5/2003 |
| EP | 2 461 228 | 6/2012 |
| EP | 3 217 261 A1 | 9/2017 |
| JP | 2002149312 A | 5/2002 |
| JP | 2011048686 A | 3/2011 |
| JP | 2011123773 A | 6/2011 |
| JP | 2012-123689 A | 6/2012 |
| JP | 2012-520523 A | 9/2012 |
| JP | 2012221387 A | 11/2012 |
| JP | 2014102829 A | 6/2014 |
| JP | 2014102830 A | 6/2014 |
| WO | 2007/111909 A2 | 10/2007 |
| WO | 2010/105001 A1 | 9/2010 |
| WO | 2010/105011 A1 | 9/2010 |
| WO | WO 2010/105001 | 9/2010 |
| WO | WO 2010105001 A1 * | 9/2010 |
| WO | 2012145264 A1 | 10/2012 |
| WO | 2014/081508 A | 5/2014 |

OTHER PUBLICATIONS

Levesque et al., Enhancing physicality in touch interaction with programmable friction, CHI '11 Proceedings of the SIGCHI Conference on Human Factors in Computing Systems, pp. 2481-2490, 2011.
Levesque et al., Exploring the Design Space of Programmable Friction for Scrolling Interactions, 2012 IEEE Haptics Symposium (HAPTICS), pp. 23-30.
United States Patent and Trademark Office, Office Action, U.S. Appl. No. 13/830,087 mailed Oct. 21, 2014.
United States Patent and Trademark Office, Office Action, U.S. Appl. No. 13/830,125 mailed Dec. 29, 2014.
Patent Cooperation Treaty, International Search Report and Written Opinion, International Application No. PCT/US2013/063042, dated Jan. 13, 2014.
European Patent Office, Extended Search Report, European Application No. 13192388, dated Feb. 5, 2014.
European Patent Office, Communication Pursuant to Article 94(3) EPC, Application No. 13192385 dated Mar. 20, 2015.
European Patent Office, Summons to Attend Oral Proceedings pursuant to Rule 115(1) EPC, Application No. 13192385 dated Mar. 24, 2016.
European Patent Office, Communication Pursuant to Article 94(3) EPC, Application No. 13192388 dated Mar. 26, 2015.
United States Patent and Trademark Office, Office Action, U.S. Appl. No. 13/830,087 dated Jul. 15, 2015.
United States Patent and Trademark Office, Office Action, U.S. Appl. No. 13/830,125 dated Aug. 12, 2015.
Chinese Patent Office Application No. 201380060656.6, Office Action with translation dated Feb. 4, 2017.
European Patent Office Application No. 13192388.0, Written Decision to Refuse dated Feb. 9, 2017.
European Patent Office Application No. 13192388.0, Summons to Attend Oral Proceedings dated Mar. 24, 2016.
Japanese Patent Office Application No. 2015-543044, Office Action dated Jun. 20, 2017.
State Intellectual Property Office of the Peoples Republic of China Application No. CN201310590718.6, Office Action dated Jul. 25, 2017.
European Patent Office Application No. P17165293.6, Extended European Search Report dated Jul. 20, 2017.
Japanese Patent Office Application No. 2013-232898, Office Action dated Aug. 22, 2017.
Japanese Patent Office Application No. 2013-232945, Office Action dated Aug. 15, 2017.
European Patent Office Application 17177508.3, Extended European Search Report dated Sep. 27, 2017.

* cited by examiner

SYSTEM AND METHOD FOR FEEDFORWARD AND FEEDBACK WITH HAPTIC EFFECTS

CROSS-REFERENCE TO RELATED APPLICATIONS

This application claims priority to Provisional Application No. 61/728,665, filed on Nov. 20, 2012, and entitled "Systems and Methods for Providing Mode or State Awareness with Programmable Surface Texture;" Provisional Application No. 61/728,661, filed on Nov. 20, 2012, and entitled "System and Method for Feedforward and Feedback with Electrostatic Friction;" and Provisional Application No. 61/728,727, filed on Nov. 20, 2012, and entitled "System and Method for Simulated Physical Interactions with Electrostatic Friction," the entirety of each of which is incorporated by reference herein.

BACKGROUND

Touch enabled devices have become increasingly popular. For instance, mobile and other devices may be configured with touch-sensitive displays so that a user can provide input by touching portions of the touch-sensitive display. As another example, a touch enabled surface separate from a display may be used for input, such as a trackpad, mouse, or other device. Furthermore, some touch enabled devices make use of haptic effects, for example, haptic effects that change the coefficient of friction a user feels on a touch-surface. This type of haptic effect can be used to provide various information to the user. Thus, there is a need for systems and methods for feedforward and feedback.

SUMMARY

Embodiments of the present disclosure include devices featuring surface-based haptic effects that simulate one or more features in a touch area. Features may include, but are not limited to, changes in texture, coefficient of friction, and/or simulation of boundaries, obstacles, or other discontinuities in the touch surface that can be perceived through use of an object in contact with the surface. Devices including surface-based haptic effects may be more user friendly and may provide a more compelling user experience.

In one embodiment, a system of the present disclosure may comprise a sensor configured to detect an interaction with a touch surface and transmit a sensor signal associated with the interaction; a processor in communication with the sensor, the processor configured to: determine an operation available on a device, the operation associated with a first user interaction; determine a simulated texture associated with the operation; output a haptic signal associated with the simulated texture; determine whether to perform the operation based on a second user interaction; and a haptic output device in communication with the processor and coupled to the touch surface, the haptic output device configured to receive a haptic signal and simulate a texture on the touch surface based in part on the haptic signal.

This illustrative embodiment is mentioned not to limit or define the limits of the present subject matter, but to provide an example to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Example of a Device for Providing Feedforward and Feedback with Haptic Effects One illustrative embodiment of the present disclosure comprises a computing system such as a smartphone, tablet, or portable music device. The computing system can include and/or may be in communication with one or more sensors, such as an accelerometer, as well as sensors (e.g., optical, resistive, or capacitive) for determining a location of a touch relative to a display area corresponding in this example to the screen of the device.

As the user interacts with the device, one or more haptic output devices, for example, actuators are used to provide tactile effects. For example, a haptic effect may be configured to change the coefficient of friction on the surface of the device. For example, as the user's finger moves across the surface, a vibration, electric field, or other effect may be output to change the coefficient of friction felt by the user. Depending on how the friction is varied, the user may perceive a feature in the touch surface that would not otherwise be perceived in the same manner (or at all) if the surface friction were not varied. As a particular example, the friction may be varied so that the user perceives a bump, border, or other obstacle corresponding to an edge of an on-screen button.

For example, one embodiment of the present disclosure may comprise a device, such as a tablet, smartphone, or music player comprising a touch screen display configured to display a plurality of icons associated with computer programs (e.g., applications for playing music, sending or receiving email, or browsing the internet). When the user interacts with the icons on the tablet, a processor will execute the program associated with the icon. Furthermore, in such an embodiment, the device may comprise an electrostatic actuator configured to adjust the coefficient of friction felt by the user as the user's finger moves across the surface of the touch screen. Thus, for example, when the touch screen detects user interaction, the processor may output a signal to the actuator to generate a haptic effect configured to change the coefficient of friction.

In some embodiments, the coefficient of friction may be varied to provide information to the user. In some embodiments, this information may be feedforward, to warn the user before the user completes an action that may be irreversible. For example, in one embodiment, when the user takes an action associated with deleting an item, the device may output an effect configured to increase the coefficient of friction to slow the user's movement. In some embodiments, this increase in friction may not be configured to stop the user's movement, but rather to warn the user that the action is irreversible. In another embodiment, a user may be entering text into an .html form on a website. In such an embodiment, if the user minimizes the website, the user may lose the text the user has entered up to that point. Thus, in such an embodiment, the device may be configured to output a haptic effect configured to simulate texture or vary the coefficient of friction if the user makes a gesture associated with minimizing the website. Again, this simulated texture or variance in the coefficient of friction may not be configured to stop the user's movement, but rather to warn the user that the action is irreversible. Similarly, in some embodiments, the device may output an effect configured to simulate a texture in order to provide a similar warning to the user.

In some embodiments, feedfoward effects may be used for other purposes. For example, in one embodiment, feedforward may be used as a confirmation. In such an embodiment, as the user enters a text message, the device may use a predictive text application to determine the word the user is likely entering. In such an embodiment, the device may further output an effect configured to simulate texture or vary the coefficient of friction in locations of a touchscreen associated with the next letters in the word the user is typing. For example, in one embodiment, as the user types "omel" predictive text software may determine that the user is typing the word "omelet" and output haptic effects configured to simulate a texture or vary the coefficient of friction over the locations of the touch screen associated with the letters "e" and "t" to help the user identify these keys.

In some embodiments, the device may increase the coefficient of friction, or output an effect configured to simulate a texture, to provide the user with confirmation that a gesture is available. For example, in one embodiment as the user moves a finger across the surface of the touch screen the user may pass over a button, slider, or other input device on the surface of the touch screen. As the user's finger passes over this input device the device may output a haptic effect configured to vary the coefficient of friction or simulate a texture to let the user know that his or her finger has passed over an input device. For example, in one embodiment, as the user's finger moves over top of a button, the device may output a haptic effect configured to increase the coefficient of friction to let the user know that his or her finger has passed over a button.

Further, in some embodiments, the device may increase the coefficient of friction, or output an effect configured to simulate a texture, to provide the user with confirmation that different types of interaction can be used to control a simulated input device (i.e. a button, switch, slider, or other input device on the touch screen display). For example, in one embodiment, as a user moves his or her finger across the surface of the touch screen, the user may feel a button as discussed above. And further, the device may output a haptic effect configured to identify that a certain operation is available. For example, in one embodiment, the device may output a texture that indicates lifting the finger off the button will activate it. In another embodiment, as the user moves a finger across the surface of the touch screen he or she feels and edge of a slider. In such an embodiment, as the user moves a finger over the slider, the device may output an effect changing the perceived coefficient of friction, or simulating a texture, to indicate that the slider can be activating by swiping. In still other embodiments, a haptic effect may be used to identify a certain interaction is not available. For example, in one embodiment, when the user moves his or her finger over a section of the touch screen associated with a button that is not currently active, the device may output a haptic effect (e.g., an effect configured to simulate a dull texture) to let the user know that the button is not currently active.

Similarly, in some embodiments, an item on the touch screen may have an associated haptic effect to identify its importance. For example, in one embodiment, a virtual input device such as a button may have a more important operation than other virtual input devices. For example, in one embodiment, the button may be associated with turning off the device or placing the device in an "airplane mode." In other embodiments, the device may use other indicators of importance. For example, in one embodiment, the user may be viewing a news application on the device. In such an embodiment, the device may be configured to apply a simulated texture or varied coefficient of friction associated with headlines. Similarly, if the user receives a message that has been marked with "high importance" the device may be configured to associate a simulated texture or coefficient of friction with this message.

In other embodiments, a simulated texture or variance in the coefficient of friction may be used to provide confirmation of an action or activation of a mode. For example, as the user makes various gestures on a touch pad or touch screen, the device may vary the coefficient of friction or simulate a texture to indicate that the gesture has been received. For example, in one embodiment, a simulated texture or variance in the coefficient of friction may be associated with a pinch to zoom in or out gesture. In such an embodiment, when the device detects a pinch to zoom gesture, it may output an effect configured to simulate a texture or variance in the coefficient of friction to confirm that the gesture has been received. In another embodiment, a simulated texture or variance in the coefficient of friction may be output to confirm receipt of a four finger gesture to return to the home screen. In still other embodiments, a simulated texture or variance in the coefficient of friction may be associated with gestures such as scrolling left/right, or up/down. In some embodiments, this may enable the user to use multiple gestural interactions with the device in rapid succession, as the simulated texture or variance in the coefficient of friction will identify that the interaction has been received so the user can immediately move on to the next interaction.

Further, in some embodiments, a simulated texture or variance in the coefficient of friction may be associated with specific device operations, for example, sending a call to voice mail, sending a text message, sending an email, downloading an update, or some other operation. In such an embodiment, when the user takes one of these actions (e.g., sends a message) a simulated texture or variance in the coefficient of friction may be output to confirm that the device is taking the expected action or has entered the proper mode.

As will be discussed in further detail below, simulating a texture on a surface or varying the coefficient of friction can be used in any number of ways to provide information to a user. Additionally, the presence of a feature in the touch surface can be simulated using effects in addition to or instead of simulating a texture or varying the coefficient of friction. Similarly, a haptic effect can be output to simulate the feeling of a texture on the surface of the device other than the display.

Illustrative Systems for Providing Feedforward and Feedback with Haptic Effects

Figure 1A:
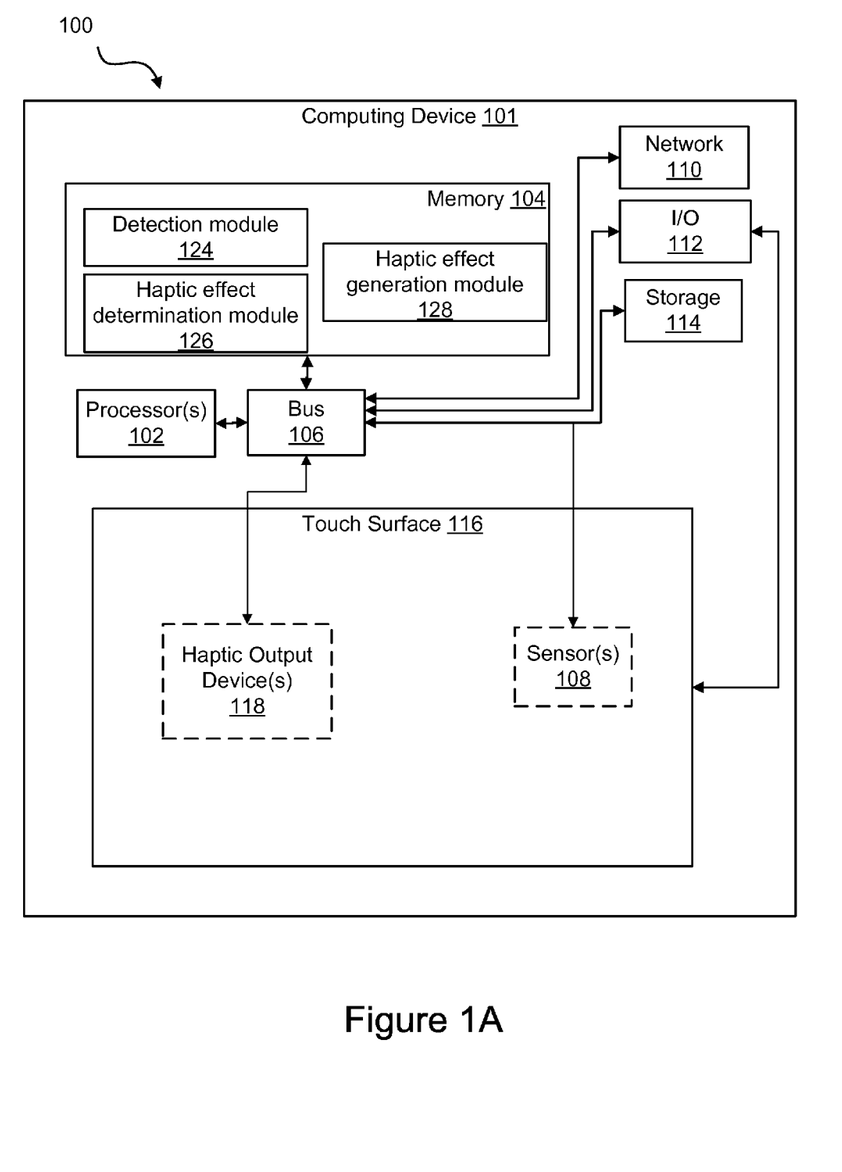
FIG. 1A shows an illustrative system for feedforward and feedback with haptic effects.

FIG. 1A shows an illustrative system 100 for providing feedforward and feedback with haptic effects. Particularly, in this example, system 100 comprises a computing device 101 having a processor 102 interfaced with other hardware via bus 106. A memory 104, which can comprise any suitable tangible (and non-transitory) computer-readable medium such as RAM, ROM, EEPROM, or the like, embodies program components that configure operation of the computing device. In this example, computing device 101 further includes one or more network interface devices 110, input/output (I/O) interface components 112, and additional storage 114.

Network device 110 can represent one or more of any components that facilitate a network connection. Examples include, but are not limited to, wired interfaces such as Ethernet, USB, IEEE 1394, and/or wireless interfaces such as IEEE 802.11, BLUETOOTH ®, or radio interfaces for accessing cellular telephone networks (e.g., transceiver/antenna for accessing a CDMA, GSM, UMTS, or other mobile communications network).

I/O components 112 may be used to facilitate connection to devices such as one or more displays, keyboards, mice, speakers, microphones, and/or other hardware used to input data or output data. Storage 114 represents nonvolatile storage such as magnetic, optical, or other storage media included in device 101.

System 100 further includes a touch surface 116, which, in this example, is integrated into device 101. Touch surface 116 represents any surface that is configured to sense tactile input of a user. One or more sensors 108 are configured to detect a touch in a touch area when an object contacts a touch surface and provide appropriate data for use by processor 102. Any suitable number, type, or arrangement of sensors can be used. For example, resistive and/or capacitive sensors may be embedded in touch surface 116 and used to determine the location of a touch and other information, such as pressure. As another example, optical sensors with a view of the touch surface may be used to determine the touch position. In some embodiments, sensor 108 and touch surface 116 may comprise a touch-screen or a touch-pad. For example, in some embodiments, touch surface 116 and sensor 108 may comprise a touch-screen mounted overtop of a display configured to receive a display signal and output an image to the user. In other embodiments, the sensor 108 may comprise an LED detector. For example, in one embodiment, touch surface 116 may comprise an LED finger detector mounted on the side of a display. In some embodiments, the processor is in communication with a single sensor 108, in other embodiments, the processor is in communication with a plurality of sensors 108, for example, a first touch-screen and a second touch screen. The sensor 108 is configured to detect user interaction, and based on the user interaction, transmit signals to processor 102. In some embodiments, sensor 108 may be configured to detect multiple aspects of the user interaction. For example, sensor 108 may detect the speed and pressure of a user interaction, and incorporate this information into the interface signal.

In this example, a haptic output device 118 in communication with processor 102 is coupled to touch surface 116. In some embodiments, haptic output device 118 is configured to output a haptic effect simulating a texture on the touch surface in response to a haptic signal. Additionally or alternatively, haptic output device 118 may provide vibrotactile haptic effects that move the touch surface in a controlled manner. Some haptic effects may utilize an actuator coupled to a housing of the device, and some haptic effects may use multiple actuators in sequence and/or in concert. For example, in some embodiments, a surface texture may be simulated or the perceived coefficient of friction may be varied (e.g., reduced or increased) by vibrating the surface at different frequencies. In such an embodiment haptic output device 118 may comprise one or more of, for example, a piezoelectric actuator, an electric motor, an electromagnetic actuator, a voice coil, a shape memory alloy, an electro-active polymer, a solenoid, an eccentric rotating mass motor (ERM), or a linear resonant actuator (LRA). In some embodiments, haptic output device 118 may comprise a plurality of actuators, for example an ERM and an LRA.

Although a single haptic output device 118 is shown here, embodiments may use multiple haptic output devices of the same or different type to simulate surface textures on the touch surface. For example, in one embodiment, a piezoelectric actuator may be used to displace some or all of touch surface 116 vertically and/or horizontally at ultrasonic frequencies, such as by using an actuator moving at frequencies greater than 20 kHz. In some embodiments, multiple actuators such as eccentric rotating mass motors and linear resonant actuators can be used alone or in concert to provide different textures and other haptic effects.

In still other embodiments, haptic output device 118 may use electrostatic attraction, for example by use of an electrostatic surface actuator, to simulate a texture on the surface of touch surface 116 or to vary the coefficient of friction the user feels when moving his or her finger across touch surface 116. For example, in one embodiment, haptic output device 118 may comprise an electrovibrotactile display or any other device that applies voltages and currents instead of mechanical motion to generate a haptic effect. In such an embodiment, the electrostatic actuator may comprise a conducting layer and an insulating layer. In such an embodiment, the conducting layer may be any semiconductor or other conductive material, such as copper, aluminum, gold, or silver. And the insulating layer may be glass, plastic, polymer, or any other insulating material. Furthermore, the processor 102 may operate the electrostatic actuator by applying an electric signal to the conducting layer. The electric signal may be an AC signal that, in some embodiments, capacitively couples the conducting layer with an object near or touching touch surface 116. In some embodiments, the AC signal may be generated by a high-voltage amplifier. In other embodiments the capacitive coupling may simulate a friction coefficient or texture on the surface of the touch surface 116. For example, in one embodiment, the surface of touch surface 116 may be smooth, but the capacitive coupling may produce an attractive force between an object near the surface of touch surface 116. In some embodiments, varying the levels of attraction between the object and the conducting layer can vary the simulated texture on an object moving across the surface of touch surface 116. Furthermore, in some embodiments, an electrostatic actuator may be used in conjunction with traditional actuators to vary the simulated texture on the surface of touch surface 116. For example, the actuators may vibrate to simulate a change in the texture of the surface of touch surface 116, while at the same time; an electrostatic actuator may simulate a different texture on the surface of touch surface 116.

One of ordinary skill in the art will recognize that, in addition to varying the coefficient of friction, other techniques or methods can be used to simulate a texture on a surface. For example, in some embodiments, a texture may be simulated or output using a flexible surface layer configured to vary its texture based upon contact from a surface reconfigurable haptic substrate (including, but not limited to, e.g., fibers, nanotubes, electroactive polymers, piezoelectric elements, or shape memory allows) or a magnetorheological fluid. In another embodiment, surface texture may be varied by raising or lowering one or more surface features, for example, with a deforming mechanism, air or fluid pockets, local deformation of materials, resonant mechanical elements, piezoelectric materials, micro-electromechanical systems ("MEMS") elements, thermal fluid pockets, MEMS pumps, variable porosity membranes, or laminar flow modulation.

In some embodiments, an electrostatic actuator may be used to generate a haptic effect by stimulating parts of the body near or touching touch surface 116. For example, in some embodiments, an electrostatic actuator may stimulate the nerve endings in the skin of a user's finger or components in a stylus that can respond to the electrostatic actuator. The nerve endings in the skin, for example, may be stimulated and sense the electrostatic actuator (e.g., the capacitive coupling) as a vibration or some more specific sensation. For example, in one embodiment, a conducting layer of an electrostatic actuator may receive an AC voltage signal that couples with conductive parts of a user's finger. As the user touches the touch surface 116 and moves his or her finger on the touch surface, the user may sense a texture of prickliness, graininess, bumpiness, roughness, stickiness, or some other texture.

Turning to memory 104, illustrative program components 124, 126, and 128 are depicted to illustrate how a device can be configured in some embodiments to provide feedforward and feedback with haptic effects. In this example, a detection module 124 configures processor 102 to monitor touch surface 116 via sensor 108 to determine a position of a touch. For example, module 124 may sample sensor 108 in order to track the presence or absence of a touch and, if a touch is present, to track one or more of the location, path, velocity, acceleration, pressure and/or other characteristics of the touch over time.

Haptic effect determination module 126 represents a program component that analyzes data regarding touch characteristics to select a haptic effect to generate. Particularly, module 126 comprises code that determines, based on the location of the touch, a simulated feature of the touch surface to generate and code that selects one or more haptic effects to provide in order to simulate the feature. For example, some or all of the area of touch surface 116 may be mapped to a graphical user interface. Different haptic effects may be selected based on the location of a touch in order to simulate the presence of the feature by simulating a texture on a surface of touch surface 116 so that the feature is felt when a corresponding representation of the feature is seen in the interface. However, haptic effects may be provided via touch surface 116 even if a corresponding element is not displayed in the interface (e.g., a haptic effect may be provided if a boundary in the interface is crossed, even if the boundary is not displayed).

Haptic effect generation module 128 represents programming that causes processor 102 to generate and transmit a haptic signal to actuator 118 to generate the selected haptic effect at least when a touch is occurring. For example, generation module 128 may access stored waveforms or commands to send to haptic output device 118. As another example, haptic effect generation module 128 may receive a desired type of texture and utilize signal processing algorithms to generate an appropriate signal to send to haptic output device 118. As a further example, a desired texture may be indicated along with target coordinates for the texture and an appropriate waveform sent to one or more actuators to generate appropriate displacement of the surface (and/or other device components) to provide the texture. Some embodiments may utilize multiple haptic output devices in concert to simulate a feature. For instance, a variation in texture may be used to simulate crossing a boundary between a button on an interface while a vibrotactile effect simulates the response when the button is pressed.

Figure 1B:
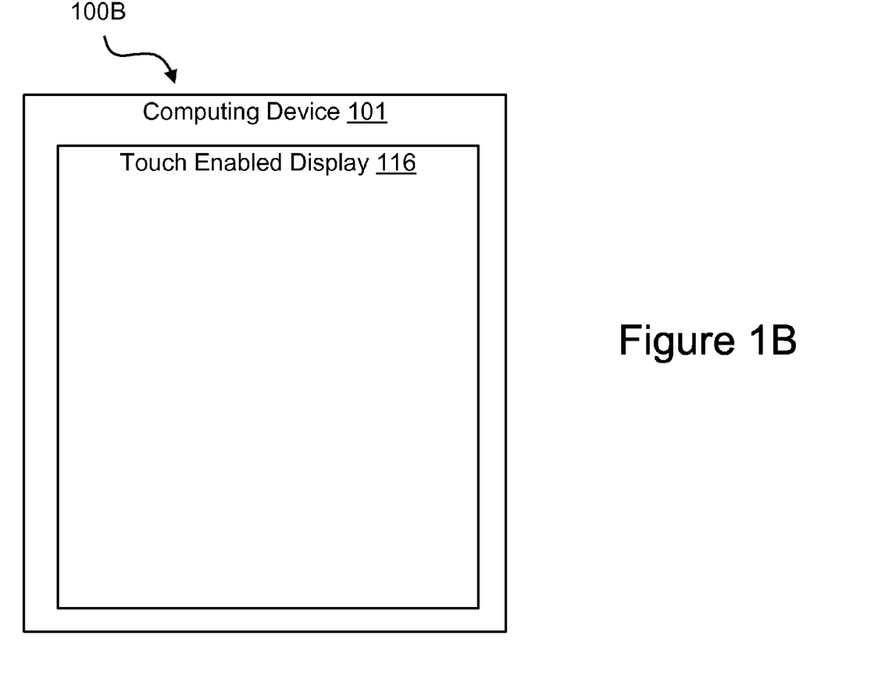
FIG. 1B shows an external view of one embodiment of the system shown in FIG. 1A.

A touch surface may or may not overlay (or otherwise correspond to) a display, depending on the particular configuration of a computing system. In FIG. 1B, an external view of a computing system 100B is shown. Computing device 101 includes a touch enabled display 116 that combines a touch surface and a display of the device. The touch surface may correspond to the display exterior or one or more layers of material above the actual display components.

Figure 1C:
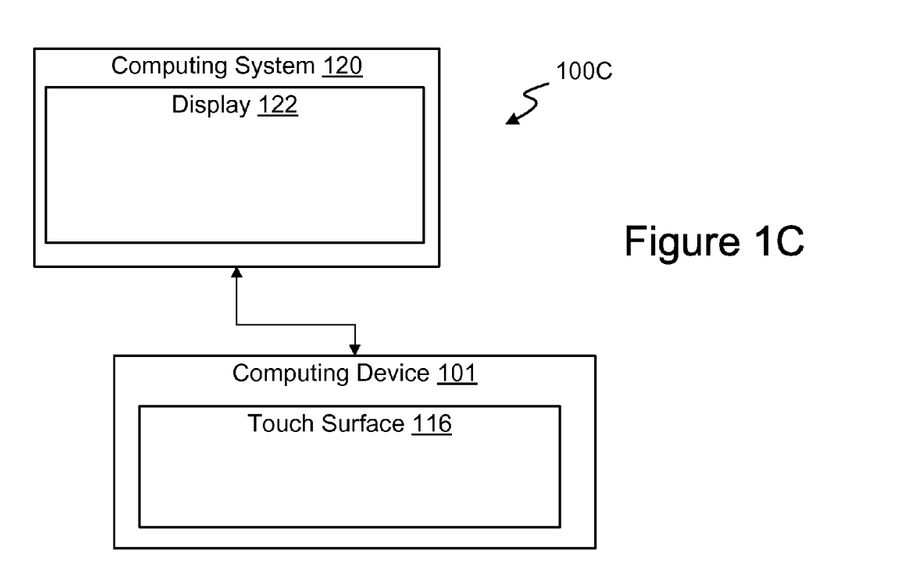
FIG. 1C illustrates an external view of another embodiment of the system shown in FIG. 1A.

FIG. 1C illustrates another example of a touch enabled computing system 100C in which the touch surface does not overlay a display. In this example, a computing device 101 comprises a touch surface 116 which may be mapped to a graphical user interface provided in a display 122 that is included in computing system 120 interfaced to device 101. For example, computing device 101 may comprise a mouse, trackpad, or other device, while computing system 120 may comprise a desktop or laptop computer, set-top box (e.g., DVD player, DVR, cable television box), or another computing system. As another example, touch surface 116 and display 122 may be disposed in the same device, such as a touch enabled trackpad in a laptop computer comprising display 122. Whether integrated with a display or otherwise, the depiction of planar touch surfaces in the examples herein is not meant to be limiting. Other embodiments include curved or irregular touch enabled surfaces that are further configured to provide surface-based haptic effects.

Figure 2A:
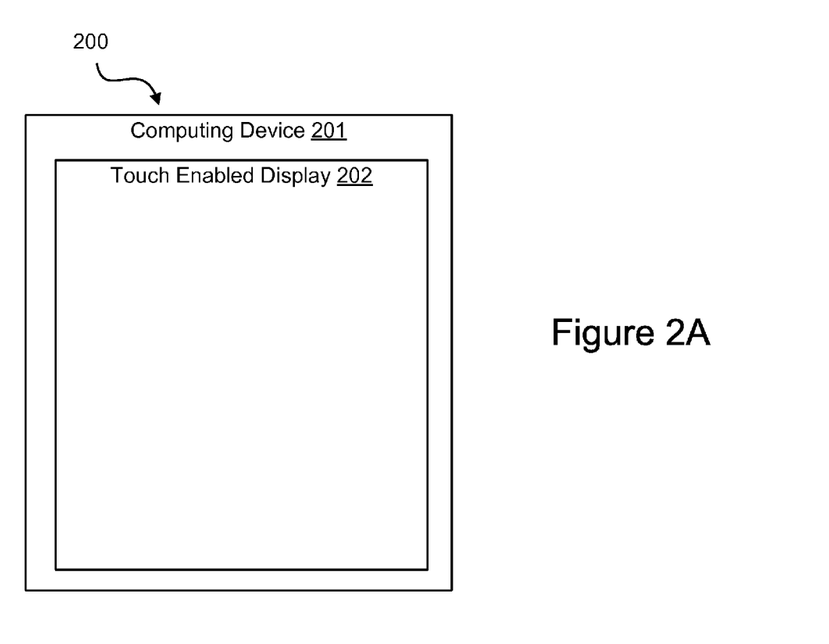
FIGS. 2A-2B illustrate an example embodiment for feedforward and feedback with haptic effects.
Figure 2B:
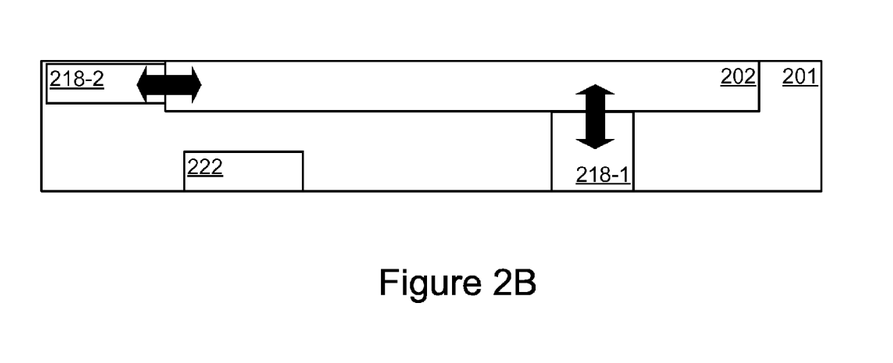

FIGS. 2A-2B illustrate an example embodiment of systems and methods for feedforward and feedback with haptic effects. FIG. 2A is a diagram illustrating an external view of a system 200 comprising a computing device 201 that comprises a touch enabled display 202. FIG. 2B shows a cross-sectional view of device 201. Device 201 may be configured similarly to device 101 of FIG. 1A, though components such as the processor, memory, sensors, and the like are not shown in this view for purposes of clarity.

As can be seen in FIG. 2B, device 201 comprises a plurality of haptic output devices 218 and an additional haptic output device 222. Haptic output device 218-1 may comprise an actuator configured to impart vertical force to display 202, while 218-2 may move display 202 laterally. In this example, the haptic output devices 218, 222 are coupled directly to the display, but it should be understood that the haptic output devices 218, 222 could be coupled to another touch surface, such as a layer of material on top of display 202. Furthermore, it should be understood that one or more of haptic output devices 218 or 222 may comprise an electrostatic actuator, as discussed above. Furthermore, haptic output device 222 may be coupled to a housing containing the components of device 201. In the examples of FIGS. 2A-2B, the area of display 202 corresponds to the touch area, though the principles could be applied to a touch surface completely separate from the display.

In one embodiment, haptic output devices 218 each comprise a piezoelectric actuator, while additional haptic output device 222 comprises an eccentric rotating mass motor, a linear resonant actuator, or another piezoelectric actuator. Haptic output device 222 can be configured to provide a vibrotactile haptic effect in response to a haptic signal from the processor. The vibrotactile haptic effect can be utilized in conjunction with surface-based haptic effects and/or for other purposes. For example, each actuator may be used in conjunction to simulate a texture on the surface of display 202.

In some embodiments, either or both haptic output devices 218-1 and 218-2 can comprise an actuator other than a piezoelectric actuator. Any of the actuators can comprise a piezoelectric actuator, an electromagnetic actuator, an electroactive polymer, a shape memory alloy, a flexible composite piezo actuator (e.g., an actuator comprising a flexible material), electrostatic, and/or magnetostrictive actuators, for example. Additionally, haptic output device 222 is shown, although multiple other haptic output devices can be coupled to the housing of device 201 and/or haptic output devices 222 may be coupled elsewhere. Device 201 may feature multiple haptic output devices 218-1/218-2 coupled to the touch surface at different locations, as well.

Figure 3A:
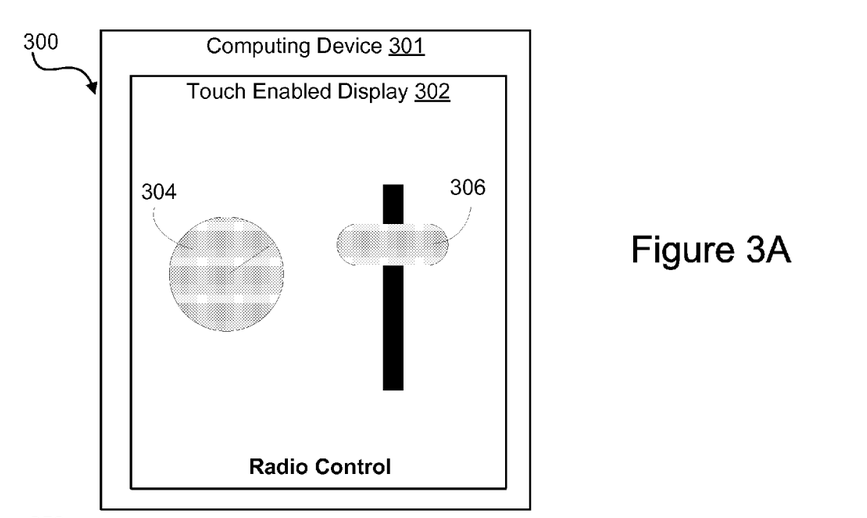
FIGS. 3A-3B depict an illustrative system for feedforward and feedback with haptic effects.

Turning to FIG. 3A, system 300 is an illustrative example of feedforward and feedback with haptic effects. FIG. 3A is a diagram illustrating an external view of a system 300 comprising a computing device 301 that comprises a touch enabled display 302. In one embodiment, computing device 301 may comprise a multifunction controller. For example, a controller for use in a kiosk, ATM, or other type of computing device. In another embodiment, the computing device may comprise a smartphone, tablet, or other type of computer. In one embodiment, computing device 301 may comprise a music player mode. In such an embodiment, computing device 301 may comprise one or more virtual controllers on display 302. These controllers may be associated with functions of a music player, thus the user may interact with the controllers to control functions of the music player. For example, in the embodiment shown in FIG. 3A, the computing device 301 may comprise controller 304 and controller 306. In such an embodiment, controller 304 may comprise an image of a knob configured to control settings of the music player, i.e., a knob to tune to a radio station, select a new song, or adjust the volume. Similarly, controller 306 may comprise an image of a slider configured to adjust another feature of the music player. In other embodiments, computing device 301 may comprise a plurality of other virtual controllers on touch enabled display, each of the virtual controls configured to control other aspects of a music player or other application.

In the embodiment described above, computing device 302 may be used to output music from a music player application to a car stereo, or be a component of the stereo itself. In such an embodiment, the user may be a driver who does not want to take his or her eyes off the road in order to adjust setting on the music player application. In such an embodiment, computing device 301 may implement a haptic effect to allow the user to identify the available functions without having to visually focus on touch enabled display 302. For example, in one embodiment, device 301 may use a haptic output device to simulate a texture on the surface of touch enabled display 302. For example, the haptic output device may output a haptic effect configured to simulate the texture of, for example, gravel, sand, sandpaper, felt, leather, metal, ice, water, grass, or another object. Based on this texture, the user may be able to determine what mode the computing device 301 is currently controlling. For example, in one embodiment, the user may know that one texture, e.g., the texture of gravel, is associated with music player controls. In such an embodiment, when the user feels the texture of gravel on the surface of touch enabled display, the user knows that computing device 301 is currently controlling the volume of the music player, without having to look at the controls. In a further embodiment, the user may be able to assign a texture to various modes that computing device 301 may control. Thus, for example, the user may be able to select a particular texture that will be associated with various functions that computing device 301 may control.

In a further embodiment, the device may further output another haptic effect when the user touches or moves each of controls 304 and 306. For example, in one embodiment, when the user touches knob 304 the user may feel a certain haptic effect configured to let the user know that he or she is touching knob 304. For example, in one embodiment, knob 304 may have a texture that differs from the texture of the background on touch-enabled display 302. Thus, the user may run his or her finger over touch enabled display, and know by the change in texture that he or she is touching knob 304. In still another embodiment, computing device 301 may output a different texture as the user adjusts knob 304. For example, in one embodiment, knob 304 may control the volume of the radio. In such an embodiment, computing device 301 may adjust the simulated texture on the surface of touch enabled display 302 as the user adjusts the volume. Thus, for example, as the user increases the volume the texture the user feels on the surface of touch enabled display may become coarser. Such a haptic effect may serve as a confirmation that the computing device 301 has received the user input.

Figure 3B:
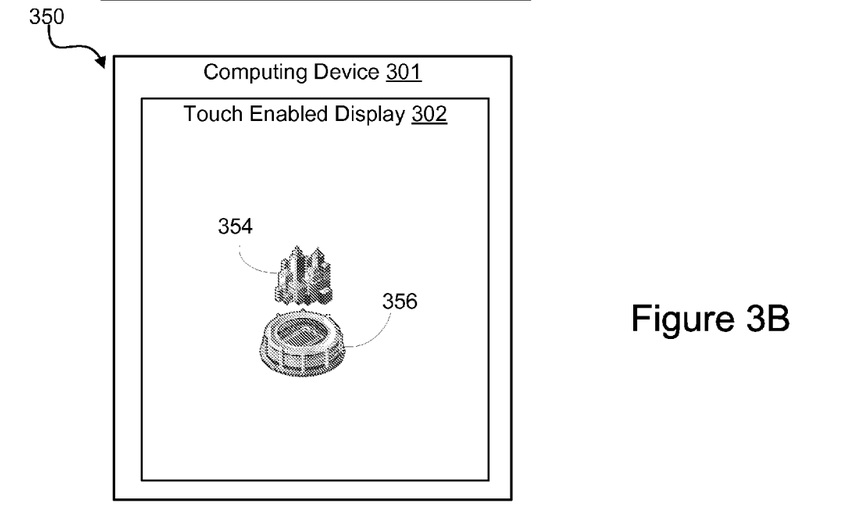

Turning to FIG. 3B, system 350 is another embodiment of the computing device 301 described above with regard to FIG. 3A. In the embodiment shown in FIG. 3B, computing device 301 comprises an icon 354. In some embodiments, icon 354 may be associated with a computer program on computing device 301. Thus, when the user interacts with a section of touch enabled display 302 that is associated with icon 354, computing device 301 may open that program. Similarly, in some embodiments, icon 354 may be associated with a data file (e.g., a music file, video file, an image or some other type of file known in the art) on computing device 301. In such an embodiment, when the user interacts with icon 354, the user may be able to open the file (e.g., listen to the music file or view the video or image associated with icon 354).

Furthermore, in the embodiment shown in FIG. 3B, icon 356 may be associated with a recycle bin or trash can. Thus, when the user uses touch enabled display 302 to move an icon over icon 356, this may serve to delete the icon and its associated program or data file. In such an embodiment, computing device 301 may be configured to output a haptic effect via touch enabled display 302 to warn the user that the action the user is taking is irreversible. For example, in one embodiment, computing device 301 may output a haptic effect configured to simulate a texture on the surface of touch enabled display 302. For example, a strong texture to serve as a warning that the action cannot be reversed. Similarly, in some embodiments, computing device 301 may be configured to output a haptic effect configured to change the coefficient of friction on the surface of touch enabled display 302. The user may then have to confirm he or she wants to take the action, for example, by continuing to move icon 354 toward icon 356.

One of skill in the art will appreciate that in other embodiments, the computing device may output haptic effects as warnings prior to completing other actions. For example, changing system settings, clearing old device data, powering down the device, navigating away from an online form, dropping a file on an icon associated with another user to send that file to the other user, or some other action associated with the computing device 301. In some embodiments, these haptic effects may serve as a warning that the user is taking an action that is irreversible or potentially dangerous, and thus may give the user an opportunity to confirm the action.

Figure 4A:
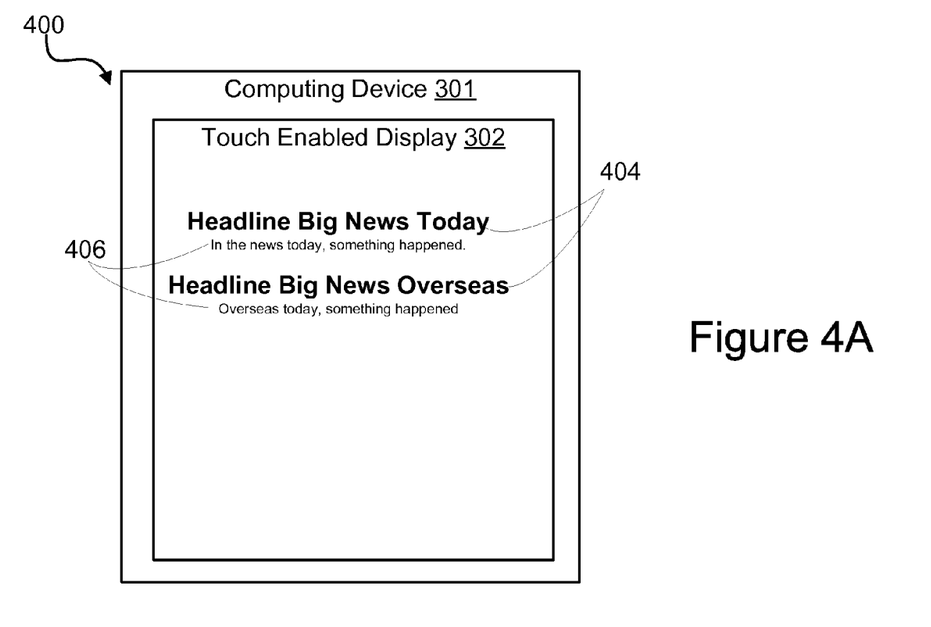
FIGS. 4A-4B depict an illustrative system for feedforward and feedback with haptic effects.

Turning to FIG. 4A, system 400 is another embodiment of the computing device 301 described above with regard to FIGS. 3A and 3B. In the embodiment shown in FIG. 4A, computing device 301 comprises a news application, which is shown in touch enabled display 302. In the embodiment shown in FIG. 4A, touch enabled display 302 shows two headlines 404, and the beginning of the news story 406. In some embodiments, computing device 301 may be configured to output haptic effects to help the user identify more important icons. For example, in the embodiment shown in FIG. 4A, as the user moves his or her finger over the surface of display 302, computing device 301 may output haptic effects. For example, in one embodiment, computing device 301 may output haptic effects as the user moves his finger over the sections of touch enabled display 302 associated with headlines 404. For example, as the user interacts with headlines 404 the computing device 301 may output a haptic effect configured to simulate a texture or change the coefficient of friction the user feels when moving his or her finger over the surface of touch enabled display 302. This may serve as an identifier to the user that the user is touching the headline. Further in some embodiments, the user may interact with a section of touch enabled display 301 in order to view the full news story associated with the headline.

In other embodiments, the user may assign importance to specific headlines, or other operations on the computing device 301, for example, the user may assign a designated haptic effect to headlines in the Business section. In such an embodiment, computing device 301 may be configured to output the designated haptic effect when the user interacts with headlines from the Business section. In other embodiments, different headlines may have varying simulated textures or coefficients of friction based on their popularity (i.e. how often an article has been read, emailed, posted to a social network, or some other measurement of popularity). For example, in one embodiment, an article that has been posted to a social network more than a certain number of times may comprise a strong texture. In other embodiments, the user may assign haptic effects to other types of information, for example, operations of computing device 301 or operations of applications running on computing device 301. In still other embodiments, the user or software running on computing device 301 may assign importance to operations of computing device 301 or applications running on computing device 301. For example, this assignment of importance may be based on past user preferences. In such an embodiment, computing device 301 may further be configured to determine haptic effects based on the assigned or determined importance.

Figure 4B:
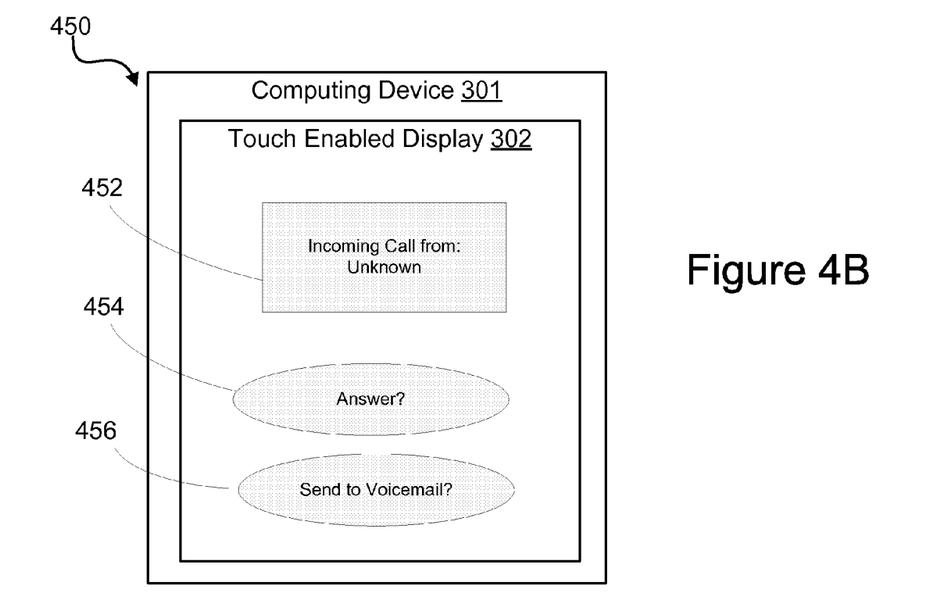

Turning to FIG. 4B, system 450 is another embodiment of the computing device 301 described above with regard to FIGS. 3A, 3B, and 4A. In the embodiment shown in FIG. 4B, touch enabled display 302 shows a telephone application. In the telephone application, touch enabled display 302 shows that the user is received an incoming call 452. Touch enabled display 302 further shows the user two options for responding to the incoming call, answer 454 or send to voicemail 456. In such an embodiment, if the user interacts with the section of touch enabled display 302 associated with answer 454, computing device 301 may answer the incoming call. Similarly, if the user interacts with the section of touch enabled display 302 associated with send to voicemail 456, the computing device 301 may send the call to voicemail.

In some embodiments, computing device 301 may output haptic effects to enable the user to determine whether he or she is touching section of touch enabled display 302 associated with answering the call 454 or sending to voicemail 456, without visually focusing on display 302. For example, in one embodiment, computing device 301 may output a simulated texture or a haptic effect configured to vary the coefficient of friction the user feels when moving his or her finger across the surface of touch enabled display 302. In some embodiments, computing device 301 may output different haptic effects (e.g., different simulated textures and/or coefficients of friction) when the user interacts with section of touch enabled display 302 associated with answering the call 454 or sending to voicemail 456. This may enable the user to determine which icon he or she is touching. For example, the user may be in a meeting and receive a telephone call while computing device 301 is in his or her pocket. In such an embodiment, the user may be able to send the call to voicemail, without having to take computing device 301 out of his or her pocket.

Figure 5:
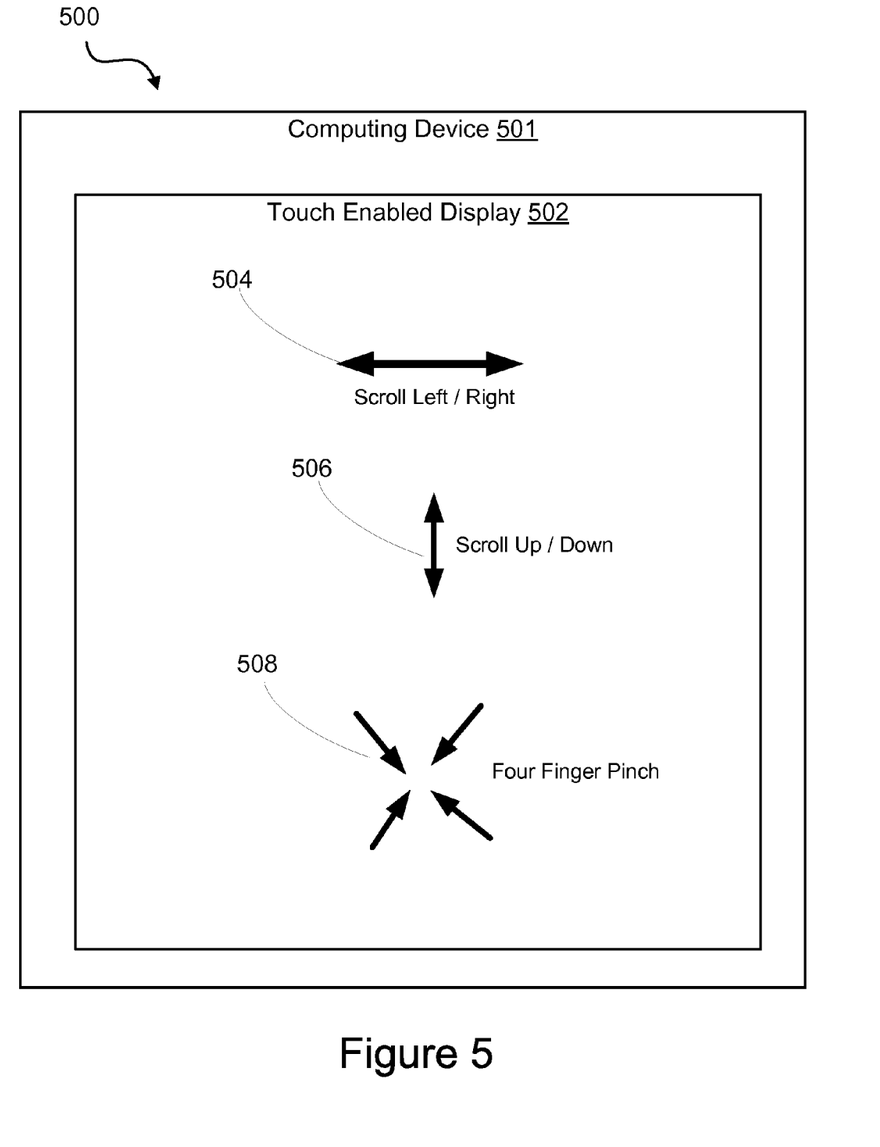
FIG. 5 is an illustration of a system for feedforward and feedback with haptic effects.

Turning now to FIG. 5, FIG. 5 illustrates an example embodiment of mode or state awareness with programmable surface texture. FIG. 5 is a diagram illustrating an external view of a system 500 comprising a computing device 501 that comprises a touch enabled display 502. In some embodiments, computing device 501 may comprise a handheld device, such as a smartphone, tablet, pocket organizer, GPS receiver, or other handheld device known in the art.

FIG. 5 further depicts three different gestural interactions 504, 506, and 508. Each of gestural interactions 504, 506, and 508 comprises a user interaction with touch enabled display 502. For example scroll left/right 504 comprises an interaction wherein the user, swipes his or her finger to the left or the right across the surface of touch enabled display 502. As known in the art, such a gesture may cause the screen shown on touch enabled display 502 to scroll to the left or the right. Similarly, scroll up/down 506 comprises a gesture wherein the user swipes his or her finger up or down across the surface of touch enabled display 502. Such a gesture may cause computing device 501 to change the screen shown on touch enabled display 502 to scroll up or down. Finally, four finger pinch 508 may occur when using four or five fingers, the user makes a pinching gesture on the surface of touch enabled display 502. Such a gesture may cause computing device 501 to display a "home" screen on touch enabled display 502. In other embodiments, other gestures detected by touch enabled surface 502 may be control computing device 501. For example, some known gestures may be gestures to zoom, gestures to change programs, or gestures to go back Further, in the embodiment shown in FIG. 5, computing device 501 may output a haptic effect to confirm receipt of a gesture. For example when a user makes a gesture to scroll left/right, computing device 501 may output a haptic effect to confirm receipt of this gesture. In some embodiments, this haptic effect may comprise a haptic effect configured to simulate a texture on the surface of touch enabled display 502. In other embodiments, this haptic effect may comprise a haptic effect configured to change the coefficient of friction the user feels when moving his or her finger over the surface of touch enabled display. In such an embodiment, the user may be scrolling through, for example, a photo album. In such an embodiment, as the user scrolls through each picture the computing device 501 may output a simulated texture of increasing intensity as the user swipes each picture to the left or right. Further, the computing device 501 may output a sharp detent as the next picture swaps into the previous picture's place on touch enabled display 502.

Similarly, in some embodiments, additional haptic effects may be output to confirm receipt of gestures such as scroll up/down 506 or four finger pinch 508. In some embodiments, these haptic effects may comprise different haptic effects. In such an embodiment, the haptic effect may allow the user to know the device has received the gesture. Thus, the user may be able to quickly move on to another gesture, and therefore be able control computing device 501 more quickly. For example, as the user engages in one gesture to scroll to a new page, a haptic confirmation may allow the user to quickly determine that the interaction has been received, and move on to a new gesture, for example, a gesture associated with opening a program. Further, a haptic effect may provide a confirmation that the program is open, allowing the user to quickly move on to a gesture associated with an operation in that program.

Illustrative Methods for Providing Feedforward and Feedback with Haptic Effects

Figure 6:
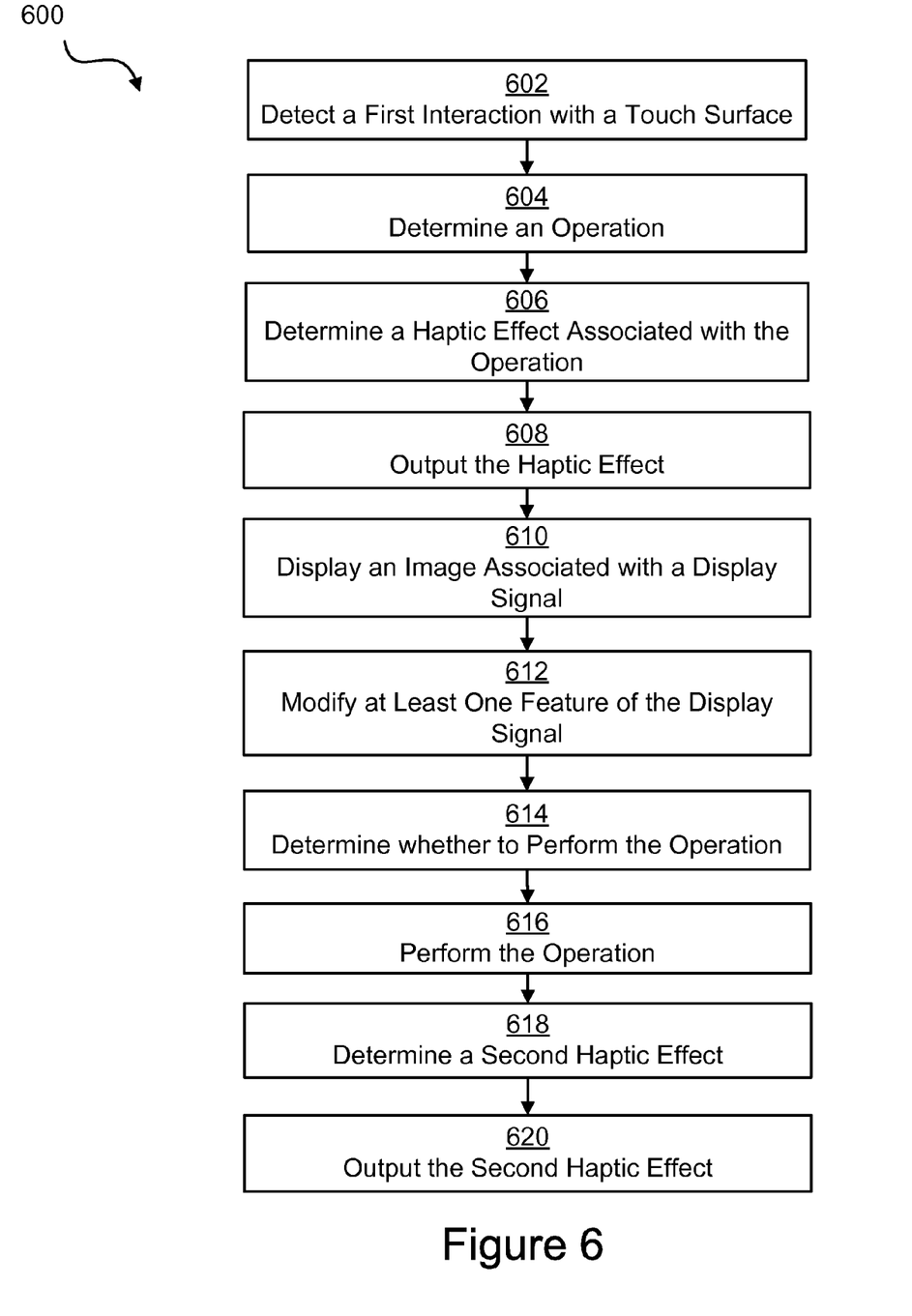
FIG. 6 is flow chart of steps for performing a method for feedforward and feedback with haptic effects.

FIG. 6 is a flowchart showing an illustrative method 600 for providing feedforward or feedback with haptic effects. In some embodiments, the steps in FIG. 6 may be implemented in program code that is executed by a processor, for example, the processor in a general purpose computer, a mobile device, or server. In some embodiments, these steps may be implemented by a group of processors. The steps below are described with reference to components described above with regard to system 100 shown in FIG. 1.

The method 600 begins when sensor 108 detects a first interaction with touch surface 116. Sensor 108 may comprise one or more of a plurality of sensors known in the art, for example, resistive and/or capacitive sensors may be embedded in touch surface 116 and used to determine the location of a touch and other information, such as pressure. As another example, optical sensors with a view of the touch surface may be used to determine the touch position. In still other embodiments, sensors 108 and touch surface 116 may comprise a touch screen display. Further, upon detecting a first interaction, sensors 108 may send a signal associated with that interaction to processor 102.

The method 600 continues when processor 102 determines an operation 604. In some embodiments, the operation may be associated with the user interaction. Further, in some embodiments, the operation may be associated with a specific mode of computing device 101. For example, computing device 101 may be configured to control a plurality of modes. In some embodiments, each of the plurality of modes comprises a plurality of features, which are also controlled by computing device 102. For example, in a navigation mode, computing device 101 may be configured to control the destination of a navigation system. For example, when in the navigation mode, the user may interact with touch surface 116 to enter navigation data, or modify settings associated with the navigation mode. In such an embodiment, a user may further be able to change the mode to another mode. For example, in such an embodiment, the user may change to another mode such as a music player mode, in which computing device 101 may be configured to control various features of a music player (e.g., volume, song selection, pause, etc.). Processor 101 may determine an operation associated with the user interaction and the mode. For example, in some embodiments, the user interaction may be associated with specific operations in the mode. For example, in one embodiment, the user interaction may be configured to cause the music player application to skip a song. In such an embodiment, detection of a specific gesture may cause processor 102 to skip a song.

The method 600 continues when processor 102 determines a haptic effect associated with the operation 606. The processor may rely on programming contained in haptic effect determination module 126 to determine the haptic effect. For example, the processor 102 may access drive signals stored in memory 104 and associated with particular haptic effects. As another example, a signal may be generated by accessing a stored algorithm and inputting parameters associated with an effect. For example, an algorithm may output data for use in generating a drive signal based on amplitude and frequency parameters. As another example, a haptic signal may comprise data sent to an actuator to be decoded by the actuator. For instance, the actuator may itself respond to commands specifying parameters such as amplitude and frequency. In some embodiments, the haptic effect may be one of a plurality of available textures. For example, the plurality of textures may comprise one or more of the textures of: water, grass, ice, metal, sand, gravel, brick, fur, leather, skin, fabric, rubber, leaves, or any other available texture, for example, a texture associated with explosions or fire. In some embodiments, the simulated texture may be associated with the mode, or features within the mode. For example, in one embodiment, a specific texture may be associated with a music player mode. In such an embodiment, the texture of sand may be associated with a music player mode. Further, in such an embodiment, different types of music may each comprise separate textures. For example, when a blue grass song is played, the texture may comprise a texture associated with grass and when heavy metal is played, the texture may comprise the texture of metal.

The method 600 continues, when haptic output device 118 outputs the haptic effect 608. In some embodiments, processor 102 outputs a haptic signal configured to cause haptic output device 118 to generate the haptic effect. In some embodiments haptic output device 118 may comprise traditional actuators such as piezoelectric actuators or electric motors coupled to touch surface 116 or other components within computing device 101. In other embodiments haptic output device 118 may comprise electrostatic actuators configured to simulate textures or vary the coefficient of friction on touch surface 116 using electrostatic fields.

The method 600 continues when an I/O component 112 displays an image associated with a display signal 610. For example, in some embodiments, I/O components 112 may comprise a display or touch screen display. In such an embodiment, the display may show an image associated with the mode. For example, in one embodiment, the display may comprise an image associated with one of the systems described with regard to FIG. 3A, 3B, 4A, 4B, or 5.

The method 600 continues when processor 102 modifies at least one feature of the display signal 612. For example, in one embodiment the user may change modes of operation by interacting with touch surface 116. Processor 102 may determine a change in the mode of operation and make a corresponding change to the image shown on the display. For example, the user may change from the news mode shown in FIG. 4A by inputting one of the gestures described with regard to FIG. 5.

The method 600 continues when processor 102 determines whether to perform the operation. For example, in one embodiment, processor 102 may determine whether to perform the operation based on a second user interaction. For example, as discussed above, in one embodiment, the haptic effect output at step 608 may comprise a warning that the user is about to take an action that is irreversible. In such an embodiment. The user may have to further confirm that the action should be taken. For example, by holding an icon overtop of a recycle bin for an extended period of time or by interacting with a confirmation icon. In other embodiments, confirmation may not be needed, and the processor may skip to step 616 below.

The method 600 continues when processor 102 performs the operation 616. Thus, in some embodiments, the processor may take the action indicated by the user's gesture. For example, in one embodiment, the processor may cause the screen to scroll up/down or left/right, based on a user's gesture as discussed with regard to FIG. 5. Further, in some embodiments, the processor may answer a call or forward a call to voicemail as discussed with regard to FIG. 4B. In other embodiments, the processor may take some other action associated with user input on a touch surface 116.

Next, processor 102 determines a second haptic effect 618. In some embodiments the second haptic effect may comprise a confirmation that the operation discussed with regard to step 616 has been completed. In other embodiments, the haptic effect may comprise a warning that the operation discussed above with regard to step 616 was not completed. The processor may rely on programming contained in haptic effect determination module 126 to determine the second haptic effect. For example, the processor 102 may access drive signals stored in memory 104 and associated with particular haptic effects. As another example, a signal may be generated by accessing a stored algorithm and inputting parameters associated with an effect. For example, an algorithm may output data for use in generating a drive signal based on amplitude and frequency parameters. As another example, a haptic signal may comprise data sent to an actuator to be decoded by the actuator. For instance, the actuator may itself respond to commands specifying parameters such as amplitude and frequency. In some embodiments, the haptic effect may be one of a plurality of available textures. For example, the plurality of textures may comprise one or more of the textures of: water, grass, ice, metal, sand, gravel, brick, fur, leather, skin, fabric, rubber, leaves, or any other available texture. In some embodiments, the simulated texture may be associated with the mode, or features within the mode. For example, in one embodiment, a specific texture may be associated with a music player mode. In such an embodiment, the texture of sand may be associated with a music player mode. Further, in such an embodiment, different types of music may each comprise separate textures. For example, when a blue grass song is played, the texture may comprise a texture associated with grass and when heavy metal is played, the texture may comprise the texture of metal.

The method 600 continues, when haptic output device 118 outputs the second haptic effect 620. In some embodiments, processor 102 outputs a haptic signal configured to cause haptic output device 118 to generate the haptic effect. In some embodiments haptic output device 118 may comprise traditional actuators such as piezoelectric actuators or electric motors coupled to touch surface 116 or other components within computing device 101. In other embodiments haptic output device 118 may comprise electrostatic actuators configured to simulate textures using electrostatic fields Advantages of Feedforward and Feedback with Haptic Effects There are numerous advantages of feedforward and feedback with haptic effects. Feedforward and feedback with haptic effects may allow the user to make a state determination (i.e. determine the mode a device is in) without having to look at the device. Thus, the user may be able to maintain focus on other tasks. For example, a user may be able to make determinations with regard to available operations on a user interface, without having to visually focus on the display. Similarly, a haptic effect may serve as a confirmation that an operation is available, has been completed, or is of a certain level of importance.

In other embodiments, feedforward and feedback with haptic effects may enable a user to use software and user interfaces more effectively. For example, a user may be able to make determinations regarding available operations in a program without having to visually focus on a display. Further, feedforward and feedback with haptic effects may serve as a warning to prevent the user from unintentionally taking an irreversible action. For example, feedforward and feedback with haptic effects may prevent a user from deleting a file by providing the user with a haptic warning prior to deleting the file.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system comprising:
   a sensor configured to detect an interaction with a touch surface and transmit a sensor signal associated with the interaction;
   a processor in communication with the sensor, the processor configured to:
      determine an operation available on a device, the operation associated with a first interaction;
      determine a haptic effect associated with the operation, wherein the haptic effect is configured to provide information associated with the operation prior to performance of the operation;
      output a haptic signal associated with the haptic effect; and
   a haptic output device in communication with the processor and coupled to the touch surface, the haptic output device configured to receive the haptic signal and output the haptic effect on the touch surface.

2. The system of claim 1, wherein the processor is further configured to:
   determine whether to perform the operation based on a second interaction; and
   perform the operation.

3. The system of claim 2, wherein the processor is further configured to:
   determine a second haptic effect associated with performing the operation; and
   output a signal associated with the second haptic effect to the haptic output device.

4. The system of claim 1, wherein the haptic effect comprises one of: a simulated texture on the touch surface or a change in a coefficient of friction on the touch surface.

5. The system of claim 1, wherein the haptic effect is associated with one or more of: a warning, a confirmation, or an importance of the operation.

6. The system of claim 1, wherein the haptic output device comprises an actuator configured to output a vibration at an ultrasonic frequency.

7. The system of claim 1, wherein the haptic output device comprises a device configured to generate an electrostatic field.

8. The system of claim 1, further comprising a display configured to receive a display signal and display an image associated with the display signal and wherein the processor is configured to modify at least one feature of the display signal based in part on the first interaction.

9. The system of claim 8, wherein the display comprises the sensor.

10. A method comprising:
detecting a first interaction with a touch surface;
determining an operation available on a device, the operation associated with the first interaction;
determining a haptic effect associated with the operation, wherein the haptic effect is configured to provide information associated with the operation prior to performance of the operation; and
outputting the haptic effect on the touch surface.

11. The method of claim 10, further comprising:
displaying an image associated with a display signal; and
modifying at least one feature of the display signal based in part on the first interaction.

12. The method of claim 10, further comprising:
determining whether to perform the operation based on a second interaction with the touch surface; and
performing the operation.

13. The method of claim 11, further comprising:
determining a second haptic effect associated with performing the operation; and
outputting the second haptic effect.

14. The method of claim 10, wherein the haptic effect comprises one of: a simulated texture on a surface of the touch surface or a change in a coefficient of friction of a surface of the touch surface.

15. The method of claim 10, wherein the haptic effect comprises one or more of: a warning, a confirmation, or an importance of the operation.

16. A non-transient computer readable medium comprising program code, which when executed by a processor is configured to cause the processor to:
detect a first interaction with a touch surface;
transmit a sensor signal associated with the first interaction;
determine an operation available on a device, the operation associated with the first interaction;
determine a haptic effect associated with the operation, wherein the haptic effect is configured to provide information associated with the operation prior to performance of the operation; and
output the haptic effect on the touch surface.

17. The non-transient computer readable medium of claim 16, further comprising program code, which when executed by a processor is configured to cause the processor to:
output a display signal comprising an image to output on a display; and
modify at least one feature of the display signal based in part on the first interaction.

18. The non-transient computer readable medium of claim 16, further comprising program code, which when executed by a processor is configured to cause the processor to:
determine whether to perform the operation based on a second interaction with the touch surface; and
perform the operation.

19. The non-transient computer readable medium of claim 16, further comprising program code, which when executed by a processor is configured to cause the processor to:
determine a second haptic effect associated with performing the operation; and
output the second haptic effect.

20. The non-transient computer readable medium of claim 16, wherein the haptic effect comprises one of: a simulated texture on a surface of the touch surface or a change in a coefficient of friction of a surface of the touch surface.

* * * * *